United States Patent
Sato (10) Patent No.: US 8,019,037 B2
(45) Date of Patent: Sep. 13, 2011

(54) PHASE DIFFERENCE DETECTION DEVICE AND ROTATION POSITION DETECTION DEVICE

(75) Inventor: Shouichi Sato, Izunokuni (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 214 days.

(21) Appl. No.: 12/295,847

(22) PCT Filed: Feb. 8, 2008

(86) PCT No.: PCT/JP2008/052158
§ 371 (c)(1),
(2), (4) Date: Oct. 2, 2008

(87) PCT Pub. No.: WO2008/096858
PCT Pub. Date: Aug. 14, 2008

(65) Prior Publication Data
US 2009/0290669 A1    Nov. 26, 2009

(30) Foreign Application Priority Data
Feb. 9, 2007    (JP) ................. 2007-030386

(51) Int. Cl.
*H03D 3/24* (2006.01)
(52) U.S. Cl. ... 375/375; 375/374; 375/373; 318/400.05; 318/611; 318/268; 318/567
(58) Field of Classification Search .................. 375/373, 375/375, 374; 318/400.05, 611, 268, 567
See application file for complete search history.

(56) References Cited

U.S. PATENT DOCUMENTS 4,975,626 A * 12/1990 Yagi et al. ........ 318/567
5,086,261 A * 2/1992 Sakata et al. ........ 318/268
(Continued)

FOREIGN PATENT DOCUMENTS
JP    61-137010    6/1986
(Continued)

OTHER PUBLICATIONS

International Search Report of PCT/JP2008/052158.
(Continued)

*Primary Examiner* — Phuong Phu
(74) *Attorney, Agent, or Firm* — DLA Piper LLP US (57) ABSTRACT

A phase difference detection device able to detect a phase with a high precision is provided. A phase difference detection device 4 detecting a phase difference θ between an excitation signal Ss and a second detection signal Sd in accordance with a rotation position θ of a rotary body 101 has a reference counter 13 performing a count in synchronization with a first clock pulse CLK1 and reset when the excitation signal Ss causes zero cross down, a velocity detection unit 19 acquiring information capable of specifying the rotation velocity of the rotary body 101, a pulse conversion unit 21 outputting a second clock pulse CLK2 by using, as a pulse interval Tp, a time specified based on the information acquired by the velocity detection unit 19 and required for the rotation of the rotary body 101 by an angle corresponding to 1 count of the reference counter 13, and a phase counter 23 in which a count value counted by the reference counter 13 is set at an initial value for each fall of a second detection signal Sd, and which performs count in synchronization with the second clock pulse CLK2.

8 Claims, 4 Drawing Sheets

U.S. PATENT DOCUMENTS

| | | | |
|---|---|---|---|
| 5,304,907 A * | 4/1994 | Abe et al. .................... | 318/611 |
| 5,433,541 A * | 7/1995 | Hieda et al. ................. | 400/279 |
| 6,433,496 B1 * | 8/2002 | Kawagoshi ............. | 318/400.05 |

FOREIGN PATENT DOCUMENTS

| | | |
|---|---|---|
| JP | 63-206612 | 8/1988 |
| JP | 03-31710 | 2/1991 |
| JP | 05-133764 | 5/1993 |
| JP | 05-276776 | 10/1993 |

OTHER PUBLICATIONS

English language translation of JP-05-133764.
English language translation of JP-05-276776.
English language abstract of JP-61-137010.
English language abstract of JP-63-206612.
English language abstract of JP-03-031710.

\* cited by examiner

PHASE DIFFERENCE DETECTION DEVICE AND ROTATION POSITION DETECTION DEVICE

TECHNICAL FIELD

The present invention relates to a phase difference detection device and a rotation position detection device detecting a phase difference of detection signals output with the phase difference in accordance with a rotation position of a measured object with respect to a reference signal.

BACKGROUND ART

Technology for shifting the phase of the reference signal by a phase difference in accordance with the rotation position of the measured object to output a detection signal and detecting the phase difference between the reference signal and the detection signal to thereby measure the rotation position of the measured object is known.

For example, Patent Document 1 discloses a phase detection device of a 2-phase input/1-phase output resolver. The resolver receives as input two excitation signals fluctuating in their signal levels at $\sin(\omega t)$ and $\cos(\omega t)$. The excitation signal is the reference signal or a signal having the same phase as that of the reference signal. The resolver outputs a detection signal obtained by shifting (phase modulating) one of the input excitation signals by a rotation angle $\theta$ of a resolver shaft. Namely, the resolver outputs a detection signal fluctuating in its signal level at $\sin(\omega t+\theta)$.

Further, the section of Prior Art of Patent Document 1 discloses technology of detecting a phase difference $\theta$ between the excitation signal (reference signal) and the detection signal by providing a counter starting a count up at a rising edge (at a time when t=0) of a signal obtained by digitalizing the excitation signal $\sin(\omega t)$ and a latch circuit latching the value of the counter at a rising edge of a signal obtained by digitalizing the detection signal $\sin(\omega t+\theta)$.

However, depending on the combination of the counter and the latch circuit as described above, the inconvenience exemplified below arises. When the measured object is rotating, the period of the detection signal fluctuates with respect to the period of the excitation signal and the period of the detection signal sometimes becomes longer than the period of the excitation signal. The faster the rotation velocity of the measured object becomes, the larger the fluctuation amount becomes. Accordingly, when the rotation velocity is fast, the next rising edge ($t=2\pi/\omega$) of the excitation signal sometimes arrives before the rising edge of the detection signal corresponding to one rising edge (t=0) of the excitation signal is detected. In this case, depending on the combination of the counter and the latch circuit as described above, before the count value indicating the phase signal of the detection signal with respect to above one rising edge (t=0) of the excitation signal is latched, the counter is reset and the measurement of the phase difference of the detection signal with respect to the next rising edge ($t=2\pi/\omega$) of the excitation signal is started. In order to prevent this, the frequency of the excitation signal is raised.

Therefore, technology providing two counters is known. In this technology, counters are reset for each two cycles of the excitation signal and at timing deviated by one cycle relative to each other. Namely, by detecting one phase difference for each two cycles of the excitation signal by one counter and alternately starting counting of the phase difference for each cycle by two counters, one phase difference is detected for each cycle. Due to this, resetting before the counter value is latched even when the period of the detection signal is long is suppressed and a drop of the frequency of the excitation signal is enabled (note that this technology will be explained later with reference to FIG. 4(a)).

Further, technology not performing the phase difference count by a counter which is reset in synchronization with the excitation signal as described above is also known. For example, technology of detecting the rotation position of a measured object by measuring the period of the detection signal, acquiring information concerning the rotation velocity of the measured object from that period, and adding up the rotation velocities of the measured object is known.

Patent Document 1: Japanese Patent Publication (A) No. 61-137010

DISCLOSURE OF INVENTION

Technical Problem

In a phase difference detection device using two counters, however, a rising edge of a detection signal is generated at either point of time between two cycles of the reference signal, and a phase difference is detected. That detected phase difference is output to a CPU at a point of time of the end of two cycles of the reference signal. Therefore, a delay time of about 1.5 cycles at the maximum occurs between the detection of the phase difference and the output of the detected phase difference. Variation occurs in that delay time. Namely, when the phase difference is output, the actual phase difference has already largely changed with respect to the output phase difference, and the amount of change varies, therefore the precision of the phase detection is low. Further, in the device detecting the phase difference by adding up rotation velocities of the measured object, when the rotation velocity is erroneously detected due to noise etc., the following phase difference will include error.

Accordingly, preferably a phase difference detection device and a rotation position detection device able to detect the phase with a high precision are provided.

Technical Solution

A phase difference detection device of the present invention is a phase difference detection device detecting a phase difference between a reference signal and a detection signal in accordance with a rotation position of a measured object, having a reference counter performing a count in synchronization with a predetermined first clock pulse and reset when a phase of the reference signal becomes a predetermined reference phase; a velocity detection unit acquiring velocity information capable of specifying a rotation velocity of the measured object; a pulse conversion unit outputting a second clock pulse by using a time specified based on the velocity information and required for rotation of the measured object at an angle corresponding to 1 count of the reference counter as a pulse interval; and a phase count unit configured to be able to latch the count value counted by the reference counter every time a phase of the detection signal becomes the reference phase, count a number of pulses of the second clock pulse after the phase of the detection signal becomes the reference phase, and output at least one of a sum or difference of the latched count value and the counted number of pulses.

Preferably, the phase count unit has a phase counter in which the count value counted by the reference counter is set at an initial value every time the phase of the detection signal becomes the reference phase and which performs a count in synchronization with the second clock pulse.

Preferably, the phase counter can repeatedly perform a count within a range the same as the range of the count value counted by the reference counter.

Preferably, the velocity detection unit acquires rotation direction information capable of specifying the rotation direction of the measured object, and the phase count unit selectively outputs either of the sum or difference of the latched count value and the counted number of pulses in accordance with the rotation direction information.

Preferably, the velocity detection unit counts the number of pulses of the first clock pulse corresponding to an amount of fluctuation, with respect to a first time length corresponding to a predetermined reference phase range of the reference signal, of a second time length corresponding to the reference phase range of the detection signal, and the pulse conversion unit outputs the second clock pulse by using, as the pulse interval, a value specified based on the number of pulses of the first clock pulse corresponding to the amount of fluctuation counted by the velocity detection unit and obtained by dividing the second time length by the number of pulses of the first clock pulse corresponding to the amount of fluctuation.

Preferably, the velocity detection unit has a down counter counting the number of pulses of the first clock pulse corresponding to the amount of fluctuation by defining the number of pulses of the first clock pulse corresponding to the first time length as the initial value and performing a count down in synchronization with the first clock pulse within the reference phase range of the detection signal.

Preferably, the reference phase range is a range between the reference phases, and the pulse conversion unit outputs the second clock pulse at the pulse interval specified based on the number of pulses of the first clock pulse corresponding to the amount of fluctuation measured by the velocity detection unit in the reference phase range immediately before the present reference phase in each of the reference phase ranges of the detection signals which sequentially arrive.

A rotation position detection device of the present invention has a resolver outputting a detection signal having a phase difference in accordance with the rotation position of a measured object with respect to an input excitation signal; an excitation circuit inputting the excitation signal to the resolver; and a phase difference detection device detecting a phase difference between the excitation signal and the detection signal, wherein the phase difference detection device has a reference counter performing a count in synchronization with a predetermined first clock pulse and reset when a phase of the excitation signal becomes a predetermined reference phase, a velocity detection unit acquiring velocity information capable of specifying a rotation velocity of the measured object, a pulse conversion unit outputting a second clock pulse by using a time specified based on the velocity information and required for rotation of the measured object at an angle corresponding to 1 count of the reference counter as a pulse interval, and a phase count unit configured to be able to latch the count value counted by the reference counter every time a phase of the detection signal becomes the reference phase, count a number of pulses of the second clock pulse after the phase of the detection signal becomes the reference phase, and output at least one of a sum or difference of the latched count value and the counted number of pulses.

ADVANTAGEOUS EFFECTS

According to the present invention, a phase can be detected with a high precision.

EXPLANATION OF REFERENCES

Ss . . . excitation signal (reference signal), 101 . . . rotary body (measured object), Sd . . . detection signal, 4 . . . phase difference detection device, CLK1 . . . first clock pulse, 13 . . . reference counter, 19 . . . velocity detection unit, CLK2 . . . second clock pulse, 21 . . . pulse conversion unit, and 23 . . . phase counter.

BEST MODE FOR CARRYING OUT THE INVENTION

Figure 1:
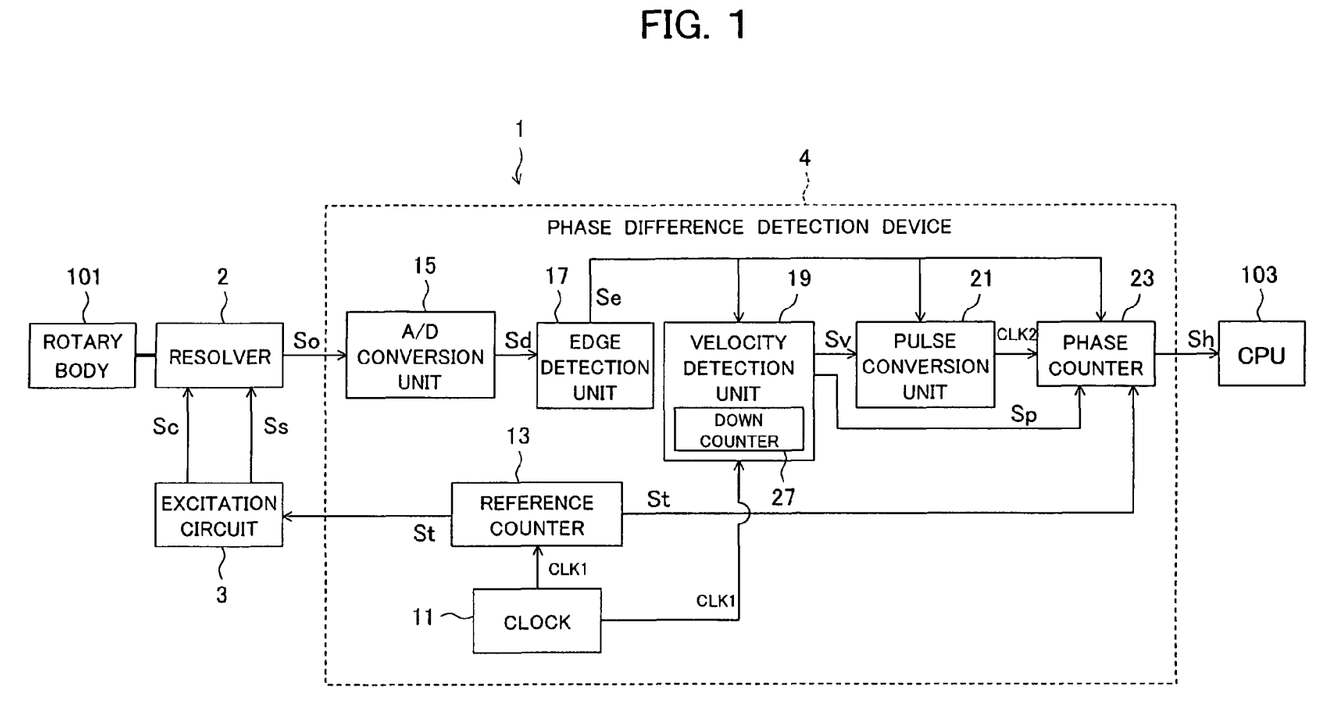
FIG. 1 A block diagram schematically showing an overall configuration of a rotation position detection device according to an embodiment of the present invention.

FIG. 1 is a block diagram schematically showing an overall configuration of a rotation position detection device 1 according to an embodiment of the present invention. The rotation position detection device 1 is configured as a device detecting the rotation position (phase) θ of the rotary body 101 serving as the measured object. The rotary body 101 is, for example, a rotor of a motor or a crankshaft of an internal combustion engine. The rotation position detection device 1 outputs a signal in accordance with the detected rotation position θ as a phase difference signal Sh. The phase difference signal Sh is, for example, output to a CPU 103 included in a computer and is used for rotation control or monitoring of the rotary body 101.

The rotation position detection device 1 has a resolver 2 connected to the rotary body 101, an excitation circuit 3 inputting excitation signals Ss and Sc to the resolver 2, and a phase difference detection device 4 detecting a phase difference between the excitation signal Ss or Sc as the reference signal and a first detection signal So output from the resolver 2. Note that both of the excitation signals Ss and Sc can become the reference signal. However, in the following description, the excitation signal Ss will be explained as the reference signal.

The resolver 2 is configured, for example, as a phase modulation type resolver of a 2-phase input/1-phase output. The resolver 2, for example, although not particularly shown, has a stator, a resolver shaft which is provided so that it can rotate relative to the stator and is biased, and two excitation coils and one detection coil which are provided in the stator. The resolver shaft is connected to the rotary body 101.

The excitation signals Ss and Sc output by the excitation circuit 3 are input to the excitation coils of the resolver 2. The excitation signals Ss and Sc are analog type signals where fluctuations of signal levels thereof are represented by a sine wave ($\sin(\omega t)$) and a cosine wave ($\cos(\omega t)$) having predetermined periods. From the detection coil of the resolver 2, an analog type first detection signal So obtained by shifting the excitation signal Ss by the rotation position θ of the resolver shaft is output. Namely, the fluctuation of the signal level of the detection signal So is represented by $\sin(\omega t+\theta)$. Accordingly, by detecting the phase difference between the excitation signal Ss and the first detection signal So, the rotation position θ of the rotary body 101 is detected. Note that, the polarity of the phase difference and rotation position differ according to the definition etc. of the rotation direction of the rotary body 101 etc. and the polarity of θ. However, an explanation will be given below assuming that polarity of the phase difference and polarity of the rotation position coincide.

The phase difference detection device 4 has a clock 11, a reference counter 13, an A/D conversion unit 15, and an edge detection unit 17 so that it can measure the phase difference between the excitation signal Sc and the first detection signal So for each zero cross point of the first detection signal So. Further, the phase difference detection device 4 has a velocity detection unit 19, a pulse conversion unit 21, and a phase counter 23 so that it can consider a fluctuation of the phase difference after the zero cross point of the first detection signal So is detected. Note that the phase difference detection device 4 may have, other than those described above, a filter circuit or other appropriate circuit.

The clock 11 outputs the first clock pulse CLK1 at a predetermined frequency. For example, the clock 11 converts a vibration of an oscillator formed by a quartz crystal, ceramic, or the like to pulses and outputs them. The frequency of the clock 11 may be appropriately set. The frequency of the clock 11 is, for example, determined based on the value of n and a period Ts explained later. The frequency of the clock 11 is, for example, 200 MHz. Note that, in FIG. 1, for the first clock pulse CLK1, only input routes to the reference counter 13 and, velocity detection unit 19 are shown. However, it may be input to the A/D conversion unit 15, edge detection unit 17, pulse conversion unit 21, phase counter 23, etc. directly or via a frequency divider and utilized.

The reference counter 13 performs a count in synchronization with the first clock pulse CLK1. Note that, the count may be a count up or count down. However, an explanation will be given below assuming that a count up is carried out. The count value of the reference counter 13 and phases of the excitation signals Ss and Sc are linked. Namely, the phases of the excitation signals Ss and Sc can be specified from the count value of the reference counter 13. The reference counter 13 is reset in the same period as the period Ts of the excitation signal Ss.

FIG. 1 exemplifies a case where the count value of the reference counter 13 is utilized for generation of excitation signals Ss and Sc. For example, the reference counter 13 is configured by an n-ary counter and repeatedly performs a count within a range of 0 to n−1. A count value i counted by the reference counter 13 is input as a count signal St to the excitation circuit 3. The excitation circuit 3 generates excitation signals Ss and Sc so that signal levels of excitation signals Ss and Sc become Vo×sin(2π/n×i+ε) and Vo×cos(2π/n×i+ε) (Vo and ε are constant). Note that ε may be appropriately set. However, an explanation will be given below assuming that ε=π, that is, the excitation signal Ss causes zero down cross when i=0.

The A/D conversion unit 15 converts the first detection signal So from the resolver 2 to a second detection signal Sd in a binary digital format and outputs the result. Namely, the A/D conversion unit outputs a signal which becomes constant in signal level at a predetermined low level (may be high level as well) when the signal level of the first detection signal So is high relative to the predetermined reference level and outputs a signal which becomes constant in signal level at a predetermined high level (may be low level as well) when the signal level of the first detection signal So is low relative to the predetermined reference level.

The edge detection unit 17 detects the edge of the second detection signal Sd from the A/D conversion unit 15. The edge detected by the edge detection unit 17 may be either of the falling edge or rising edge or both as well. However, an explanation will be given below assuming that the falling edge is detected.

The edge detection unit 17 outputs an edge detection signal Se when detecting the falling edge. For example, the edge detection unit 17 outputs a signal of a low level (0, false) when the falling edge is not detected and outputs a signal of a high level (1, true) as the edge detection signal Se for a length of 1 clock of the clock 11 when the falling edge is detected.

The velocity detection unit 19 measures an amount of fluctuation ΔT of a period Td of the second detection signal Sd (first detection signal So) with respect to the period Ts of the excitation signal Ss, outputs information indicating the absolute value of the amount of fluctuation ΔT as a velocity signal Sv to the pulse conversion unit 21, and outputs information indicating a polarity (increase or decrease) of the amount of fluctuation ΔT as a polarity signal Sp to the phase counter 23.

For example, the velocity detection unit 19 has a down counter 27 performing a count down in synchronization with the first clock pulse. The down counter 27 is reset in its count value to the initial value every time the edge detection signal Se is input from the edge detection unit 17. The initial value of the down counter 27 is set at the maximum value n−1 of the reference counter 13. In other words, the initial value of the down counter 27 is set to the number of pulses of the first clock pulse counted by the reference counter 13 in one cycle of the excitation signal Ss (reference signal).

Figure 2:
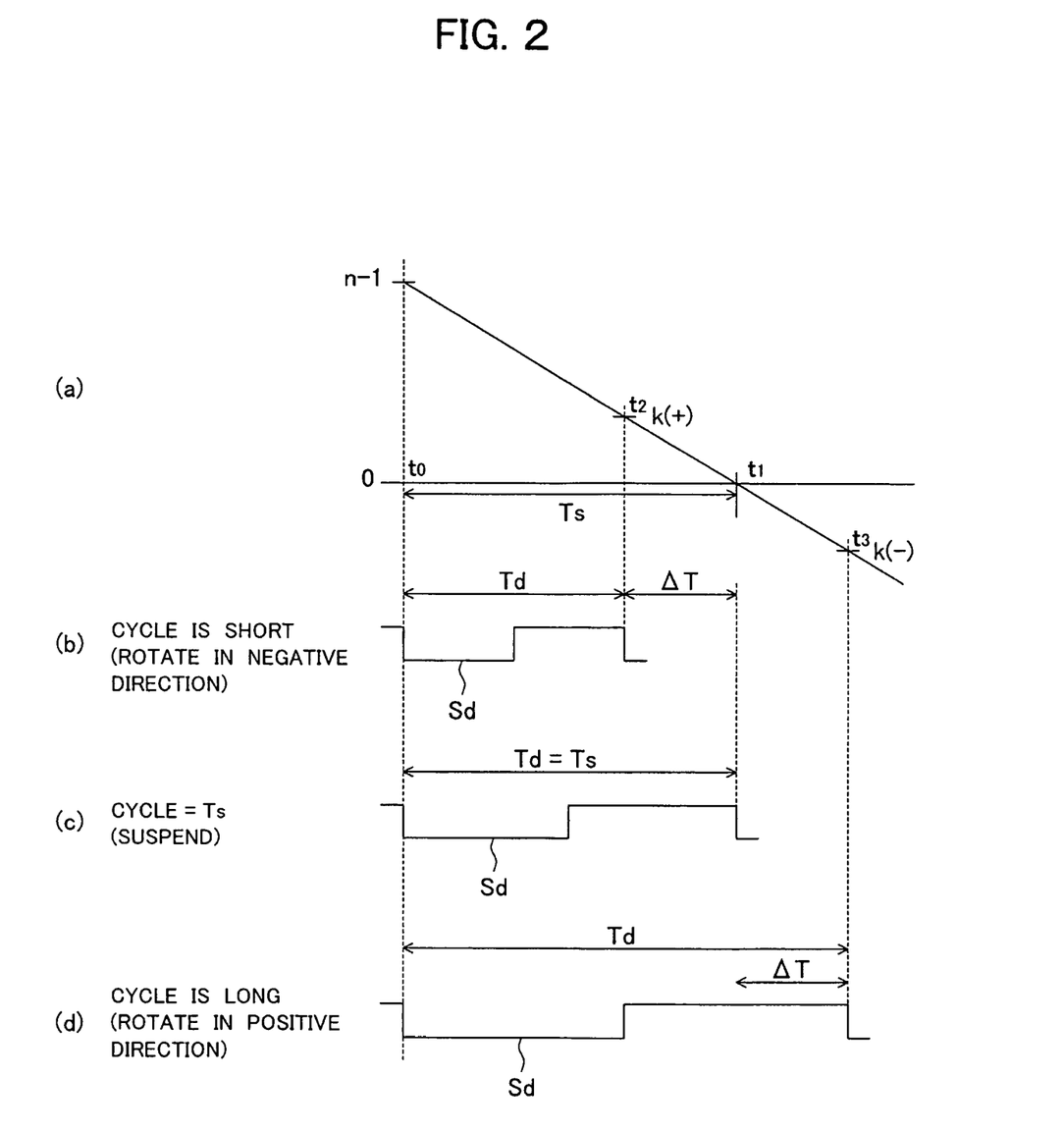
FIG. 2 A timing chart explaining an operation of a down counter of the rotation position detection device of FIG. 1.

FIG. 2 is a diagram explaining the operation of the down counter 27.

As shown in FIG. 2(a), the down counter 27 is, at a point of time t0 when the falling edge of the second detection signal Sd is detected, reset to the initial value n−1 and starts count down. As shown in FIG. 2(C), when the period Td of the second detection signal Sd is equal to the period Ts of the excitation signal Ss (case of Td=Ts, ΔT=0), that is, when the rotary body 101 stops, as shown in FIG. 2(a), the count value of the down counter 27 immediately before being reset at the point of time t1 when the next falling edge of the second detection signal Sd is detected becomes 0.

On the other hand, as shown in FIG. 2(b), when the period Td of the second detection signal Sd is shorter than the period Ts of the excitation signal Ss, that is, when the rotary body 101 is rotating in one direction (negative direction of θ in the present embodiment), as shown in FIG. 2(a), the count value of the down counter 27 immediately before being reset at the point of time t2 when the next falling edge of the second detection signal Sd is detected becomes a positive value k. k is the number of pulses of the first clock pulse CLK1 corresponding to the amount of fluctuation ΔT.

In the same way, as shown in FIG. 2(d), when the period Td of the second detection signal Sd is longer than the period Ts of the excitation signal Ss, that is, when the rotary body 101 is rotating in the other direction (positive direction of θ in the present embodiment), as shown in FIG. 2(a), the count value of the down counter 27 immediately before being reset at the point of time t3 when the next falling edge of the second detection signal Sd is detected becomes the negative value k. The absolute value of k becomes the number of pulses of the first clock pulse CLK1 corresponding to the amount of fluctuation ΔT.

Note that, an equation of the excitation signal Ss and polarity of θ etc. may also be set so that the value of k becomes positive when the rotary body 101 rotates in the positive direction of θ, and the value of k becomes negative when the rotary body 101 rotates in the negative direction of θ.

As shown in FIG. 1, the velocity detection unit 19 outputs an absolute value |k| of the count value k immediately before the down counter 27 is reset as the velocity signal Sv to the pulse conversion unit 21. For example, although not particularly shown, the velocity detection unit 19 has a latch circuit latching the count value of the down counter 27 in synchronization with the first clock pulse CLK1 and holds 1 clock previous count value 1 of the down counter 27 by the latch circuit. Then, when the edge detection signal Se from the edge detection unit 17 is detected, the absolute value |k| of the count value held in the latch circuit is output as the velocity signal Sv to the pulse conversion unit 21.

Further, the velocity detection unit 19 outputs the polarity signal Sp indicating the polarity of the count value k immediately before the down counter 27 is reset to the phase counter 23. For example, when the edge detection signal Se from the edge detection unit 17 is detected, the polarity of the count value held by the not shown latch circuit is output as the polarity signal Sp.

The pulse conversion unit 21 outputs the second clock pulse CLK2 by using, as a pulse interval Tp, Td/|k| obtained by dividing the period Td of the second detection signal Sd by the absolute value |k| of the number of pulses corresponding to the amount of fluctuation $\Delta T$. Note that, when k=0, the pulse interval Tp is set to be infinite. Namely, when k=0, the pulse conversion unit 21 does not output the second clock pulse CLK2. The period Td of the second detection signal Sd may be specified according to an appropriate method. For example, it is calculated by the pulse conversion unit 21 subtracting a value obtained by multiplying the pulse interval of the first clock pulse CLK1 by the count value k from the period Ts of the excitation signal Ss. The period Ts of the excitation signal Ss is, for example, stored in advance or calculated by multiplying the pulse interval of the first clock pulse CLK1 by the maximum value n−1 of the reference counter 13.

The phase counter 23 is configured by, for example, an n-ary counter having a preset function and up/down switching function. The phase counter 23 sets the count value i of the reference counter 13 at the initial value (latches the count value i) when the edge detection signal Se is input from the edge detection unit 17. Then, it performs a count in synchronization with the second clock pulse CLK2. The count is switched to either count up or count down in accordance with the polarity signal Sp. For example, as explained above, when the rotation position θ and the count value i are linked so that the count value i of the reference counter 13 increases when the rotation position θ increases, the count down is carried out when a symbol of the amount of fluctuation $\Delta T$ indicated by the polarity signal Sp is positive, that is, when the rotary body 101 is rotating in the negative direction of θ, and the count up is carried out when the symbol of the amount of fluctuation $\Delta T$ indicated by the polarity signal Sp is negative, that is, when the rotary body 101 is rotating in the positive direction of θ.

Figure 3:
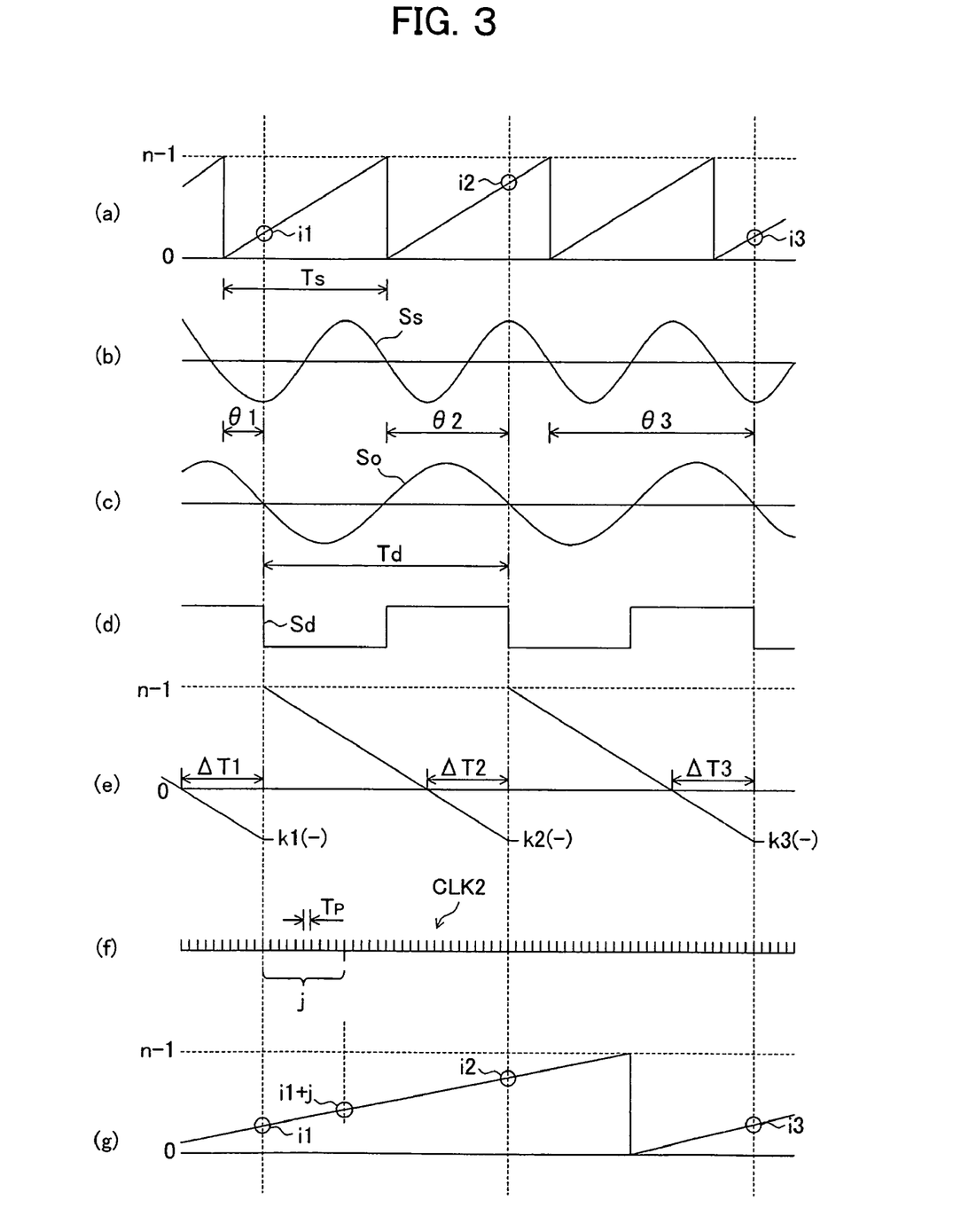
FIG. 3 A timing chart explaining the operation of the rotation position detection device of FIG. 1.

FIG. 3 is a timing chart for explaining the operation of the phase difference detection device 4. FIG. 3(a) shows the count value counted by the reference counter 13, FIG. 3(b) shows the signal level of the excitation signal Ss output by the excitation circuit 3, FIG. 3(c) shows the signal level of the first detection signal So output by the resolver 2, FIG. 3(d) shows the signal level of the second detection signal Sd output by the A/D conversion unit 15, FIG. 3(e) shows the count value counted by the down counter 27, FIG. 3(f) shows the second clock pulse CLK2 output by the pulse conversion unit 21, and FIG. 3(g) shows the count value counted by the phase counter 23.

As shown in FIG. 3(a), the reference counter 13 repeatedly performs count within the range of 0 to n−1 in the constant period Ts. As shown in FIG. 3(b), the excitation signal Ss is represented by a waveform having a period Ts the same as the period Ts of the reference counter 13. Note that, as explained above, in the present embodiment, it is assumed that the excitation signal $Ss=V_0 \times \sin(2\pi/n \times i + \pi)$ is generated with respect to the count value i of the reference counter, therefore the excitation signal Ss causes zero down cross at the time of reset of the reference counter 13.

As shown in FIG. 3(c), the first detection signal So is represented by a waveform obtained by shifting the phase of the excitation signal Ss by the rotation position θ of the rotary body 101. Note that the period Td of the first detection signal So fluctuates with respect to the period Ts of the excitation signal Ss where the rotary body 101 is rotating. In FIG. 3(c), a case where the phase differences of θ1, θ2, and θ3 occur at the time of the zero down cross of the first detection signal So is exemplified, and a case where the rotary body 101 is rotating in the positive direction of θ and the period Td of the first detection signal So has become longer than the period Ts of the excitation signal Ss is exemplified.

As shown in FIG. 3(d), the second detection signal Sd is represented by a square wave having the same phase as that of the first detection signal So. The rise of the second detection signal Sd corresponds to the zero up cross of the first detection signal So, and the fall of the second detection signal Sd corresponds to the zero down cross of the first detection signal So.

As shown in FIG. 3(e), the down counter 27 starts a count down from the fall of the second detection signal Sd in synchronization with the first clock pulse CLK1 by using n−1 as the initial value. As shown in FIG. 3(a) and FIG. 3(b), the count of 0 to n−1 in synchronization with the first clock pulse corresponds to the period Ts of the excitation signal Ss. Therefore, the count value k counted to the next fall by the down counter 27 corresponds to the amount of fluctuation $\Delta T$ of the second detection signal Sd with respect to the period Ts of the excitation signal Ss. Note that, in FIG. 3(e), a case where the period Td of the second detection signal Sd is longer than the period Ts of the excitation signal Ss, and negative count values k1, k2, and k3 are counted corresponding to amount of fluctuations $\Delta T1$, $\Delta T2$, and $\Delta T3$ is exemplified.

As shown in FIG. 3(f), the pulse conversion unit 21 outputs the second clock pulse CLK2 by using, as the pulse interval Tp, Td/|k| obtained by dividing the period Td of the second detection signal Sd by the absolute value |k| of the count value k. The pulse conversion unit 21, for example, calculates the pulse interval Tp for each fall of the second detection signal Sd and outputs the second clock pulse CLK2 at that calculated pulse interval Tp from immediately after that falling to the next fall. Namely, the pulse conversion unit 21 calculates the pulse interval Tp for each cycle of the second detection signal Sd and outputs the second clock pulse CLK2 at that calculated pulse interval Tp in the next cycle to the cycle targeted by that calculation.

As shown in FIG. 3(g), the phase counter 23 latches the count value i of the reference counter 13 at the fall of the second detection signal Sd. FIG. 3(g) shows a case where the count values i1, i2, and i3 are latched. The latched count value i corresponds to the phase difference θ between the excitation signal Ss and the second detection signal Sd at the time of latching. Namely, at the time of latching, $\theta = 2\pi/n \times i$, and θ1, θ2, and θ3 can be specified from the count values i1, i2, and i3.

After latching the count value i, the phase counter 23 performs a count in synchronization with the second clock pulse CLK2 by using the latched count value i as the initial value. Note that, FIG. 3(*g*) exemplifies a case where the count up is carried out corresponding to the symbol of k becoming negative in FIG. 3(*e*).

Here, the occurrence of the amount of fluctuation ΔT between the period Ts of the excitation signal Ss and the period Td of the second detection signal Sd means that the phase difference θ between the excitation signal Ss and the second detection signal Sd fluctuates during the period Td by an angle corresponding to the amount of fluctuation ΔT. Namely, the rotary body 101 rotates during the period Td by the amount of fluctuation 2π/n×|k| of the phase difference θ. Then, the pulse interval Tp=Td/|k| means the time required for the rotary body 101 to rotate by an angle (2π/n) corresponding to 1 count of the reference counter 13.

Accordingly, to perform a count in synchronization with the second clock pulse CLK2 means to count the count value which must be latched at the reference counter 13 in accordance with the fluctuation of the phase difference θ due to the rotation of the rotary body 101.

For example, in FIG. 3(*g*), a count value i1 is latched, and the count up is carried out in synchronization with the clock pulse CLK2 output at a pulse interval Tp=ΔT1/|k1|, whereby a count value i1+j counted by the phase counter 23 approaches a count value i2 which is latched next.

Note that, when the rotation velocity of the rotary body 101 becomes large, the absolute value |k| of the count value of the down counter becomes large, the pulse interval Tp becomes small, and a gradient of the count value i+j of the phase counter 23 becomes large. Further, as a degree of acceleration of the rotary body 101 is smaller (the rotation velocity is more constant), the count value counted by the phase counter 23 more correctly approaches the count value of the reference counter 13 which is latched next.

The phase counter 23, in FIG. 3(*g*), as exemplified between the count value i2 and the count value i3, is reset to 0 when the count value i+j reaches n−1 by the count up. Further, when a count value i−j reaches 0 by the count down, it is reset to n−1. Namely, the phase counter 23 can repeatedly count within the same range (0 to n−1) as that of the reference counter 13. In other words, the range of the count value of the phase counter 23 corresponds to a range 0 to 2π of the rotation position θ of the rotary body 101.

As described above, in the present embodiment, during a term from when the count value of the reference counter 13 is latched to when it is latched next, the count value to be latched at the reference counter 13 is counted by the phase counter 23, therefore the timing of phase detection is not limited to the falling edge of the second detection signal Sd. Namely, the phase can be detected all the time or at any timing.

Figure 4:
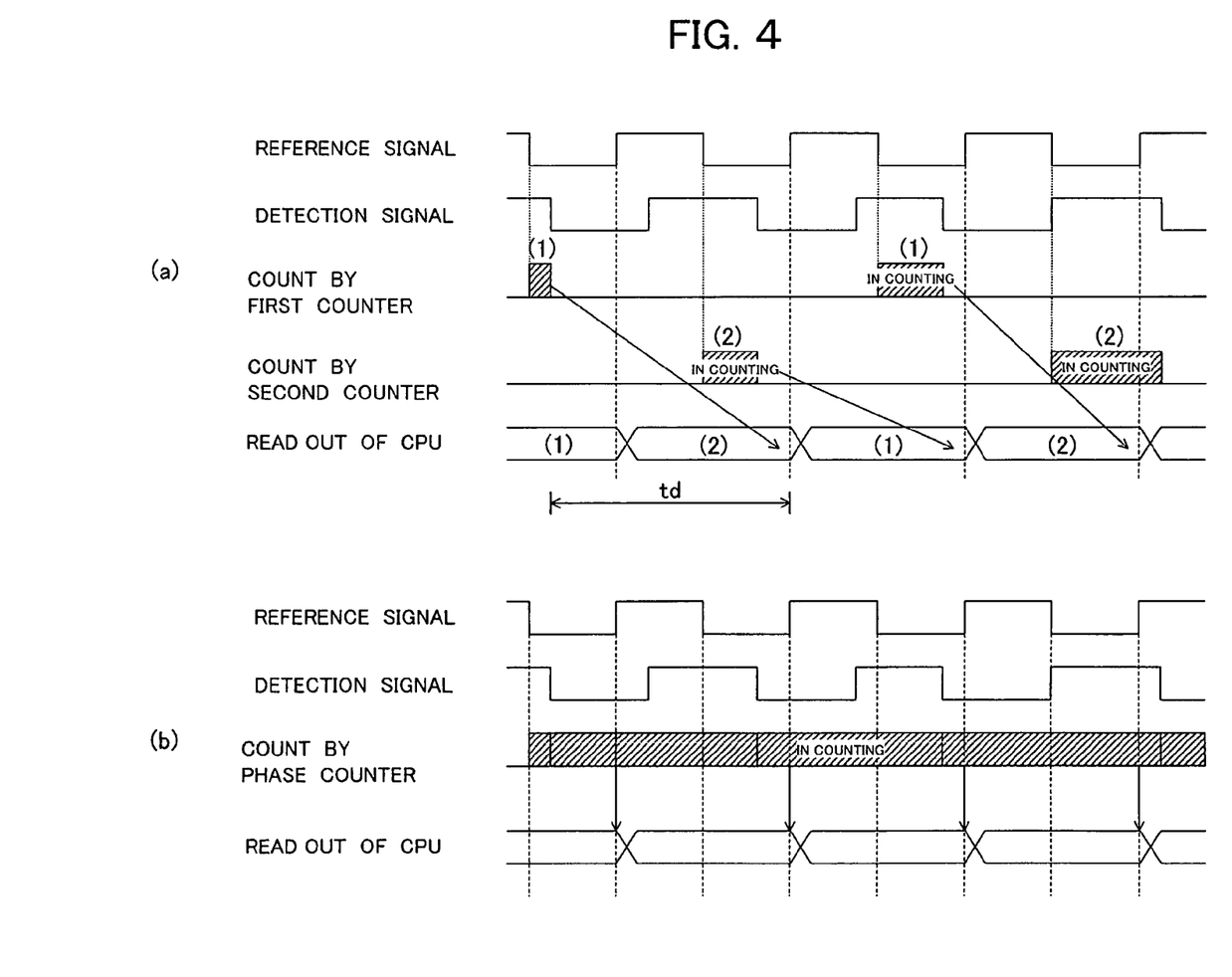
FIG. 4 A timing chart explaining effects of the rotation position detection device of FIG. 1.

FIG. 4 is a timing chart explaining effects of the present embodiment. FIG. 4(*a*) shows a timing chart in the prior art, and FIG. 4(*b*) shows a timing chart in the present embodiment.

In FIG. 4(*a*), the detection of the phase difference is carried out by the first counter and second counter. Specifically, each counter starts the count from the falling edge of the reference signal. A value being counted is latched as the phase difference when the falling edge of the detection signal is detected. Counters are reset for each 2 cycles of the excitation signal and at timing deviated from each other by 1 cycle.

The CPU connected to the phase difference detection device reads out, at the rising edge of the excitation signal, a phase in which measuring is started from the falling edge 1 cycle before the falling edge immediately before this time.

For this reason, during a term from when the phase is detected by the counter to when the phase is read out to the CPU, a delay time td of 1.5 cycles at the maximum and 0.5 cycle at the minimum are generated. Further, the delay time td fluctuates along with the fluctuation of the phase difference.

On the other hand, as shown in FIG. 4(*b*), in the present embodiment, the phase is always detected by the phase counter. Accordingly, a delay time does not occur during the term from when the phase is detected by the phase counter to when the phase is read out to the CPU. Alternatively, only a constant delay time caused by characteristic features of circuits occurs. Further, a constant delay time can be appropriately set as well.

Further, according to the present embodiment, the phase counter 23 is reset for each falling edge of the second detection signal Sd. Therefore, even when noise is mixed into the detection signal etc. and error occurs in the count value of the phase counter 23, the error is erased by reset. Accordingly, the influence of noise is small in comparison with the conventional method of calculating the phase by adding up the velocities.

The amount of fluctuation ΔT of the period Td with respect to the period Ts is counted by the down counter 27 using the number of pulses of the first clock pulse CLK1 corresponding to the period Ts of the excitation signal Ss as the initial value and performing a count down in synchronization with the first clock pulse CLK1 in the period Td of the second detection signal Sd, therefore the configurations of the velocity detection unit 19 and pulse conversion unit 21 are simple.

In each period Td of the second detection signal Sd, the second clock pulse CLK2 is output by using the pulse interval Tp specified from the period Td immediately before the present cycle, therefore the velocity will be successively updated, and the phase difference θ can be detected with a high precision even in a case where the degree of acceleration of the rotary body 101 is large.

Note that, in the above embodiments, the excitation signal Ss is one example of the reference signal, the first detection signal So and second detection signal Sd are examples of the detection signal of the present invention, the phase (π) at the time when the zero down cross or falling edge occurs is one example of the reference phase, the phase range (2π) corresponding to 1 cycle is one example of the reference phase range, the period Ts is one example of the first time length, the period Td is one example of the second time length, the absolute value |k| of the count value of the down counter 27 is one example of the velocity information, and the polarity of that count value k is one example of the rotation direction information. Further, the phase count unit of the present invention is configured by the phase counter 23.

The present invention is not limited to the above embodiments and may be executed in various aspects.

The phase difference detection device is not limited to one detecting the phase difference between the excitation signal and the detection signal of the resolver. Further, the resolver is not limited to a 2-phase input/1-phase output one. This may be a resolver of a phase modulation type outputting the detection signal with a phase difference in accordance with the rotation position of the measured object with respect to the reference signal. For example, it may also be a 2-phase input/2-phase output resolver. The reference signal and detection signal may also be an analog type and digital type.

The reference counter is not limited to one whose count value is supplied for the generation of the reference signal (excitation signal). This may be one performing a count based on the reference signal such as one starting a count based on the zero cross detection and edge detection of the reference signal.

The range of the count value of the reference counter may be set so that the phase can be specified from the count value from the reference phase of the reference signal to the next reference phase. The reference phase may be set at an appropriate phase and is not limited to a phase causing zero cross and a phase causing an edge. Further, the reference phase need not be a phase defining 1 cycle either. Accordingly, for example, the count value 0 may correspond to an appropriate phase other than the phase 0.

Further, for example, both phases of the phase causing zero up cross and the phase causing zero down cross of the reference signal may be used as reference phases as well. Namely, a reference phase may be set for each half cycle of the reference signal as well. In this case, the phase counter (phase count unit) is reset for each half cycle of the reference signal, therefore the range of influence of the error caused by noise becomes narrow. Further, if the reference phase range is a half cycle as well, the amount of fluctuation of the half cycle of the detection signal is counted, and the pulse interval of the second clock pulse is updated for each half cycle, therefore the phase difference can be detected with a high precision when the degree of acceleration is large or the like.

Further, for example, the reference phase may be set for each several cycles of the reference signal as well. For example, in a case of detecting the rotation position of the crankshaft of a four-cycle engine, by linking the range 0 to n−1 of the count value of the reference counter with the phase 0 to 4π and resetting the reference counter for each two cycles of the reference signal, specifying of which process a process is may be enabled as well.

The phase count unit is not limited to one having a phase counter equipped with a preset function latching the count value of the reference counter as the initial value, in other words, one always holding the count value which must be latched at the reference counter. For example, the phase count unit may be configured by including a latch circuit latching the count value of the reference counter in the reference phase of the detection signal, a counter reset to 0 at the time of that latch, and an adder (subtractor) circuit outputting the sum or difference of the count value latched by the latch circuit and the count value counted by the counter at an appropriate timing. Note that a configuration using the phase counter equipped with the preset function latching the count value of the reference counter as the initial value is simpler.

The phase counter need not be one capable of switching between count up and count down. In other words, the phase count unit need not be capable of selectively outputting either of the sum or difference of the latched count value of the reference counter and the counted number of pulses of the second clock pulse in accordance with the rotation direction of the rotary body. If the rotary body rotates in only one direction like the crankshaft of an motorcycle, it need only have either a count up or count down function.

The velocity detection unit may acquire information capable of specifying the rotation velocity of the measured object by an appropriate method and is not limited to one counting the amount of fluctuation (for example ΔT) of the second time length (for example, Td) corresponding to the reference phase range of the detection signal with respect to the first time length (for example, Ts) corresponding to the reference phase range of the reference signal. For example, if the change of the rotation velocity of the measured object is gentle, by calculating the change of the phase difference (θ) from several times the phase difference obtained by latching the count value of the reference counter in the reference phase of the detection signal, the velocity can be specified. Further, the method of measuring the amount of fluctuation (for example ΔT) is not limited to the method using the down counter in synchronization with the first clock pulse. For example, an up counter may be used in synchronization with another clock pulse.

The reference phase range which becomes the target of comparison of the time length of the reference signal and the time length of the detection signal need not be the range between reference phases either. The reference phase range and the range between reference phases may be set so that phases are deviated as well, and the sizes of the ranges may differ from each other. For example, the reference phase may be set at the phase causing zero up cross, the reference phase range may be set between phases causing zero down cross, and the pulse conversion unit may use the pulse interval calculated based on the amount of fluctuation of the time length using the reference phase range as the target between reference phases which are deviated from that reference phase range by a half cycle. In this case, an excess of a half cycle is formed during a term from the detection of the amount of fluctuation to when the second clock pulse is output at the pulse interval based on that amount of fluctuation. Therefore, a delay time may occur in the pulse conversion unit etc., and the design conditions of circuits become looser.

The invention claimed is:

1. A phase difference detection device detecting a phase difference between a reference signal and a detection signal in accordance with a rotation position of a measured object comprising:
   a reference counter performing a count in synchronization with a predetermined first clock pulse and reset when a phase of the reference signal becomes a predetermined reference phase;
   a velocity detection unit acquiring velocity information capable of specifying a rotation velocity of the measured object;
   a pulse conversion unit outputting a second clock pulse by using a time specified based on the velocity information and required for rotation of the measured object by an angle corresponding to 1 count of the reference counter as a pulse interval; and
   a phase count unit configured to be able to latch the count value counted by the reference counter every time a phase of the detection signal becomes the reference phase, count a number of pulses of the second clock pulse after the phase of the detection signal becomes the reference phase, and output at least one of a sum or difference of the latched count value and the counted number of pulses.

2. A phase difference detection device as set forth in claim 1, wherein the phase count unit has a phase counter in which the count value counted by the reference counter is set at an initial value every time the phase of the detection signal becomes the reference phase and which performs a count in synchronization with the second clock pulse.

3. A phase difference detection device as set forth in claim 2, wherein the phase counter can repeatedly perform a count within a range the same as the range of the count value counted by the reference counter.

4. A phase difference detection device as set forth in claim 1, wherein
   the velocity detection unit acquires rotation direction information capable of specifying the rotation direction of the measured object, and the phase count unit selectively outputs either of the sum or difference of the latched count value and the counted number of pulses in accordance with the rotation direction information.

5. A phase difference detection device as set forth in claim 1, wherein the velocity detection unit counts the number of pulses of the first clock pulse corresponding to an amount of fluctuation, with respect to a first time length corresponding to a predetermined reference phase range of the reference signal, of a second time length corresponding to the reference phase range of the detection signal, and the pulse conversion unit outputs the second clock pulse by using, as the pulse interval, a value specified based on the number of pulses of the first clock pulse corresponding to the amount of fluctuation counted by the velocity detection unit and obtained by dividing the second time length by the number of pulses of the first clock pulse corresponding to the amount of fluctuation.

6. A phase difference detection device as set forth in claim 5, wherein the velocity detection unit has a down counter counting the number of pulses of the first clock pulse corresponding to the amount of fluctuation by defining the number of pulses of the first clock pulse corresponding to the first time length as the initial value and performing a count down in synchronization with the first clock pulse within the reference phase range of the detection signal.

7. A phase difference detection device as set forth in claim 5, wherein the reference phase range is a range between the reference phases, and the pulse conversion unit outputs the second clock pulse at the pulse interval specified based on the number of pulses of the first clock pulse corresponding to the amount of fluctuation measured by the velocity detection unit in the reference phase range immediately before the present reference phase in each of the reference phase ranges of the detection signals which sequentially arrive.

8. A rotation position detection device comprising:

a resolver outputting a detection signal having a phase difference in accordance with the rotation position of a measured object with respect to an input excitation signal;

an excitation circuit inputting the excitation signal to the resolver; and a phase difference detection device detecting a phase difference between the excitation signal and the detection signal, wherein the phase difference detection device has a reference counter performing a count in synchronization with a predetermined first clock pulse and reset when a phase of the excitation signal becomes a predetermined reference phase, a velocity detection unit acquiring velocity information capable of specifying a rotation velocity of the measured object, a pulse conversion unit outputting a second clock pulse by using a time specified based on the velocity information and required for rotation of the measured object at an angle corresponding to 1 count of the reference counter as a pulse interval, and a phase count unit configured to be able to latch the count value counted by the reference counter every time a phase of the detection signal becomes the reference phase, count a number of pulses of the second clock pulse after the phase of the detection signal becomes the reference phase, and output at least one of a sum or difference of the latched count value and the counted number of pulses.

* * * * *